United States Patent [19]

Hartman

[11] Patent Number: 4,697,838
[45] Date of Patent: Oct. 6, 1987

[54] ROBOT GRIPPING JAW OPERATOR

[76] Inventor: John F. Hartman, Box 50 Gardiner Rd., Apalachin, N.Y. 13732

[21] Appl. No.: 742,924

[22] Filed: Jun. 10, 1985

[51] Int. Cl.⁴ ............................................. B25J 15/08
[52] U.S. Cl. ..................................... 294/88; 294/115; 414/732; 414/739; 901/29; 901/37
[58] Field of Search ...................... 294/88, 86.4, 86.41, 294/106, 115, 116; 414/732, 735, 738, 739, 744 A, 751, 753; 901/28–31, 35–39

[56] References Cited

U.S. PATENT DOCUMENTS

| | | | |
|---|---|---|---|
| 3,236,397 | 2/1966 | Lakin | 294/88 X |
| 3,312,496 | 4/1967 | Boutelle et al. | 294/88 X |
| 3,386,297 | 6/1968 | Willis | 294/88 X |
| 3,421,643 | 1/1969 | Barbee | 294/88 X |
| 3,422,967 | 1/1969 | Aron | 414/753 |
| 3,764,023 | 10/1973 | Jatcko | 294/88 X |
| 4,211,123 | 7/1980 | Mack | 294/88 X |
| 4,234,223 | 11/1980 | O'Neil | 294/88 |
| 4,304,433 | 12/1981 | Langowski | 294/106 |
| 4,336,926 | 6/1982 | Inagaki et al. | 294/88 X |
| 4,509,783 | 4/1985 | Ionescu | 294/106 X |
| 4,561,825 | 12/1985 | Sakata | 901/35 X |

Primary Examiner—Johnny D. Cherry
Attorney, Agent, or Firm—Shlesinger, Arkwright & Garvey

[57] ABSTRACT

A robot gripper jaw assembly includes a support plate having front and rear faces. Jaw mounts extend from the front face and cooperating jaws are pivotally mounted to the jaw mounts for gripping work. The support plate has an opening therein generally centrally disposed relative to the jaw mounts and a cylinder and piston assembly is secured to the support plate rear face in alignment with the opening. The piston of the cylinder and piston assembly extends through the opening and is engagable with the jaws so that forward and rearward movement of the piston causes cooperative pivoting of the jaws for closing and opening the jaws for gripping and releasing work. The support plate and the cylinder and piston assembly have a central rotational axis and the robot includes an assembly for simultaneously rotating the support plate and the cylinder and piston assembly on the rotational axis.

30 Claims, 7 Drawing Figures

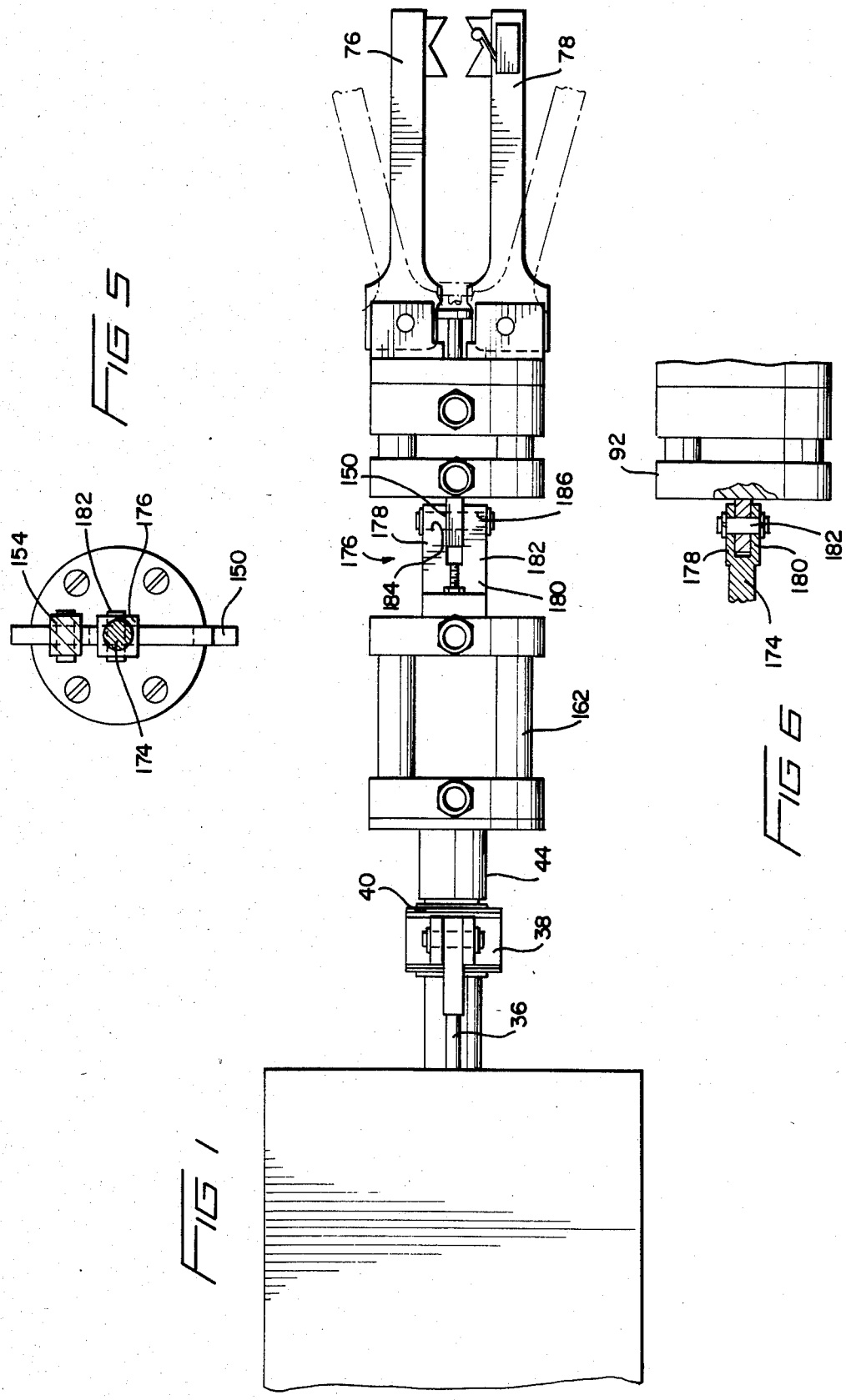

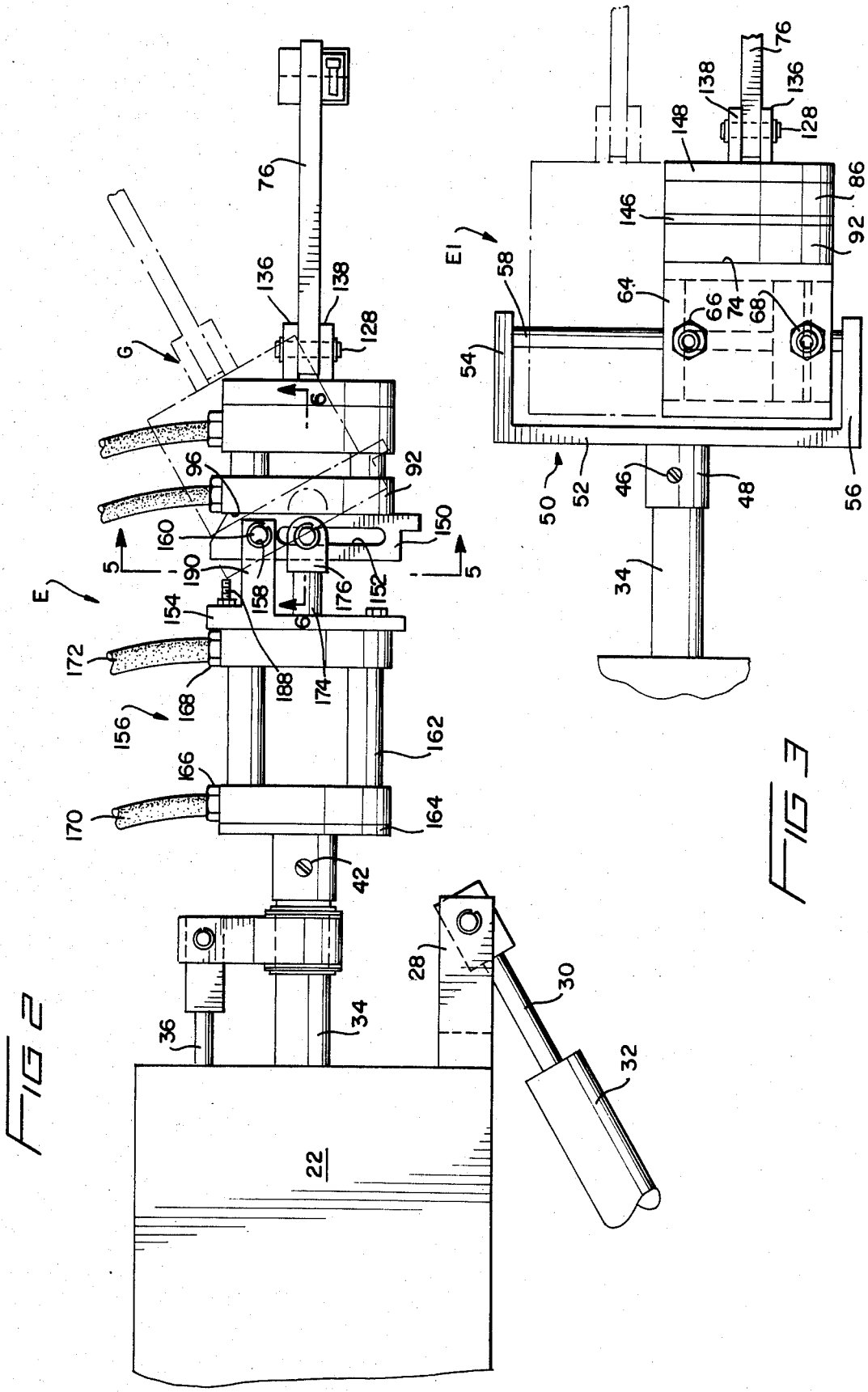

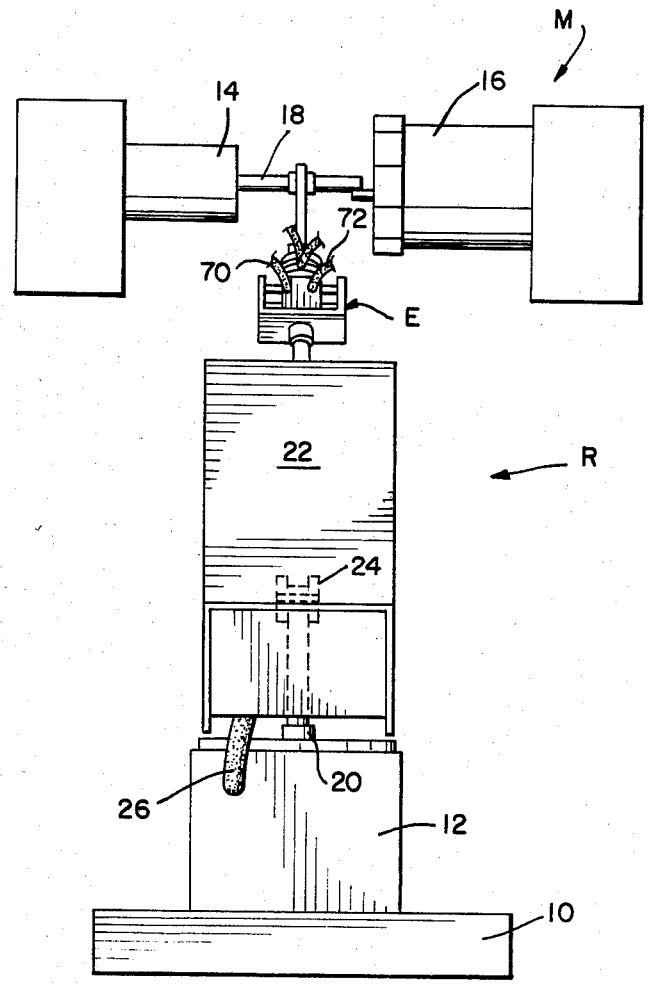
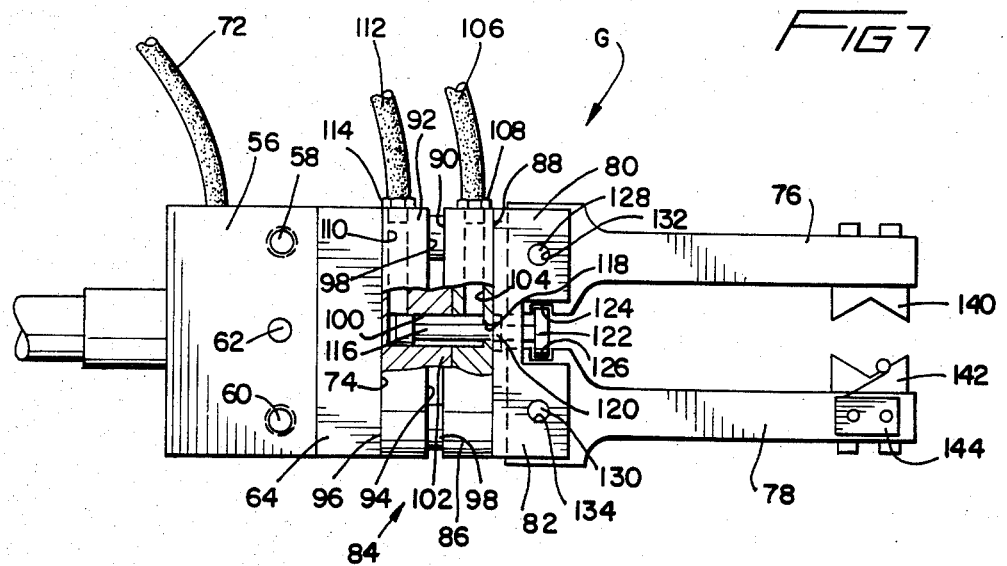

ROBOT GRIPPING JAW OPERATOR

BACKGROUND OF THE INVENTION

Robots continue to play an ever increasing role in the search for optimizing the efficient operation of a manufacturing or other similr facility. The robot permits the worker to be one step removed from the actual production process. The robot must therefore be able to substantially imitate and/or duplicate the functions and operations previously performed by the worker. Many worker operations and functions are, however, of such a unique character that a single robot end effector is unable to duplicate these functions. Consequently, numerous designs for the end effector of a robot have been proposed, and many of these designs have been expressly designed for a given task.

Economical implementation of a robot assembly requires that the robot be relatively inexpensive, simple to operate and not subject to excessive downtime. Furthermore, the robot must be capable of performing numerous tasks. The robot must therefore be adaptable because the user cannot always forsee the uses to which the device may be put to in the future. It is therefore important that the robot be able to accomodate the need of the user without requiring substantial alteration.

The end effector or gripping jaw assembly of the robot is that portion utilized to grasp the workpiece. The jaws must have sufficient gripping force to hold the workpiece during movement of the workpiece from one place to another by the robot. The gripping jaw assembly must also have sufficient accuracy in its holding of the workpiece so that positioning of the workpiece after movement may be accurately and repeatedly performed.

Many tasks require that the end effector, which includes the gripping jaw assembly, have wrist-like capability. In other words, the gripping jaw assembly must be able to pivot just as does the human wrist. Also, lateral displacement of the gripping jaw assembly is necessary in many applications. Consequently, the end effector must be able to duplicate these human movements if the robot is to have substantial utility.

The end effector must be relatively simple in assembly in order to decrease the possibility of breakdown. For that reason, it is preferred that the end effector include an assembly either permitting lateral shifting or wrist action. The gripping jaw assembly remains the same whether wrist action or lateral action is necessary and thereby the number and complexity of parts and components may be minimized.

Baily, U.S. Pat. No. 4,365,928, discloses a fluid power connector system for a robot manipulator. Baily discloses utilization of a piston for causing movement of the gripper fingers of the manipulator. The Baily disclosure fails to teach a gripper assembly which has universal mounting capability. Rather, the disclosed gripper mechanism is essentially usable only with the disclosed robot arm assembly. Furthermore, the disclosed mechanism of Baily is relatively complicated and thereby subject to breakdown.

It can be seen, therefore, that a new and unique operator for a robot gripper assembly permitting a single gripper assembly to be utilized for both wrist and lateral shifting operations is desirable. The disclosed invention provides such an operator for a gripper assembly for utilization of an air-operated cylinder and piston assembly which operates on a pair of gripping jaws and which includes means permitting universal mounting to the robot end effector.

OBJECTS AND SUMMARY OF THE INVENTION

The primary object of the disclosed invention is to provide a robot gripping jaw operator which is adapted for mounting to an end effector permitting lateral shifting or simulating wrist action.

An additional object of the disclosed invention is to provide a robot gripping jaw assembly which utilizes a cylinder and piston assembly for causing cooperative displacement of the gripping jaws.

Yet another of the disclosed invention is to provide a robot gripping jaw assembly which is relatively simple to manufacture from a relatively few number of parts.

Yet an additional object of the disclosed invention is to provide a cylinder and piston assembly for the operation of the gripping jaw assembly which extends longitudinally coincident with or parallel to the longitudinal axis of the arm of the robot.

Still a further object of the disclosed invention is to provide a robot gripping jaw assembly which permits lateral shifting without causing the assembly to pivot on its shifting axis.

Yet another object of the disclosed invention is to provide an operator comprising a support plate including first and second spaced parallel support members in which the cylinder and piston assembly is coaxially mounted and each of the support members has a radially extending fluid supply duct for thereby permitting operation of the cylinder and piston assembly.

Still another object of the disclosed invention is to provide an end effector permitting wrist-like action by means of pivotally mounting the gripping jaw assembly to the cylinder of a cylinder and piston assembly adjacent the piston so that inward and outward movement of the piston causes pivoting of the gripping jaw assembly.

Still a further object of the disclosed invention is to provide that the piston for pivoting the gripping jaw assembly is coaxially mounted relative to the elongated axis robot arm.

Yet another object of the disclosed invention is to provide a guideway on the gripping jaw assembly to which the distal end of the piston is displacably mounted in order to accommodate pivoting.

In summary, the disclosed invention is a robot gripping jaw assembly comprising a support plate assembly having front and rear surfaces. A pair of jaw mounts extend forwardly from the front face and a gripping jaw is pivotally mounted to each of the mounts and cooperate with each other for gripping work. The support plate has an opening centrally positioned between the mounts and a cylinder and piston assembly secured to the rear face and a portion of the piston extends through the opening forwardly of the front face and is engageable with the jaws. The piston has a portion engageable with the jaws so that movement of the piston causes cooperative movement of the jaws. The support plate and the cylinder and pistion assembly have a central rotational axis and the robot arm includes means for simultaneously rotating the arm and the end effector on that axis.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is a top plan view of the end effector of the invention mounted to a fragmentary portion of a robot arm and with pivoting of the jaws shown in phantom line;

FIG. 2 is a side elevational view of the device of FIG. 1 with pivoting of the gripping jaw assembly shown in phantom;

FIG. 3 is a top plan view of another embodiment of the invention with lateral shifting of the gripping jaw assembly shown in phantom line;

FIG. 4 is a side elevational view of the gripping jaw assembly of FIG. 3 with portions broken away to disclose detail;

FIG. 5 is a cross-sectional view taken along the section 5—5 of FIG. 2 and viewed in the direction of the arrows;

FIG. 6 is a cross-sectional view taken along the section 6—6 of FIG. 2 and viewed in the direction of the arrows; and FIG. 7 is a rear elevational view of a robot assembly proximate a fragment of a machine tool.

DESCRIPTION OF THE INVENTION

As best shown in FIG. 7, robot R is mounted to support 10 by means of base or housing 12 adjacent machine tool M. The machine tool M is generally shown as a lathe having a rotatable spindle 14 and a tool holding turret 16. The spindle 14 preferably includes means (not shown) for grasping and releasing a piece of work, such as roundstock 18.

Robot R further includes rotatable shaft 20 extending upwardly from base 12 and to which arm housing 22 is pivotally connected by hinge assembly 24. Preferably, robot r is an air-powered robot and air supply line 26 extends from base 12 into arm housing 22 wherein a valve mechanism for distributing the air to the various operating components of the robot R is disposed.

As best shown in FIG. 2, arm housing 22 has a forward member 28 to which piston 30 of cylinder 22 is pivotally connected. The cylinder 32 is, preferably, utilized for causing upward and downward pivoting of arm housing 22 on hinge assembly 24 so that the robot may be utilized fully. Robot arm or shaft 34 extends forwardly from arm housing 22 and is adapted for movement longitudinally relative to housing 22, as will be explained. Piston 36 of a cylinder (not shown) housed in arm housing 22 is operatively connected to arm 34 by means of clevis assembly 38. Clevis assembly 38 preferably includes bearings 40 annularly mounted to shaft 34 in order to permit rotation of the arm or shaft 34 on its longitudinal axis. Preferably the means for rotating the arm 34 on its axis is positioned in the arm housing 22. For further disclosure of the rotation mechanism, please see may copending patent application Ser. No. 737,493, filed May 24, 1985 and entitled ROTARY MECHANISM FOR ROBOT ARMS.

End effector E is mounted to the distal portion of arm 34 by means of set screw 42 extending through collar 44. Likewise, end effector E1, as best shown in FIG. 3, is secured to shaft 34 by set screw 46 extending through collar 48. It can be noted that both collars 44 and 48 are coaxially disposed relative to shaft 34 so that the end effectors E and E1 are properly positioned relative to the shaft 34.

As best shown in FIG. 3, U-shaped bracket 50 has transverse member 52 secured to collar 48. Arms 54 and 56 extend forwardly from transverse member 52 a substantial distance. Support rod 58 extends between arms 54 and 56, as does lower support rod 60, as best shown in FIG. 4. Piston or shaft 62 is in alignment with support rods 58 and 60 and cylinder 64 is slideably disposed thereon. Air connections 66 and 68 connect with air supply line 26 and the valve mechanism (not shown) in order to cause the cylinder 64 to laterally shift between the arms 54 and 56, as may be needed. The support rods 58 and 60 prevent the cylinder 64 from pivoting downwardly on the piston 62. In this way, the support rods 58 and 60, which also extend through cylinder 64, serve the important function of preventing downward pivoting of the cylinder 64 when work 18 is held. Preferably air lines 70 and 72, as best shown in FIG. 7, are flexible in order to accommodate this lateral shifting of the cylinder 64.

As best shown in FIG. 4, gripping jaw assembly G is mounted to forward face 74 of cylinder 64. Gripping jaw assembly G includes a pair of gripping jaws 76 and 78 pivotally mounted to jaw mounts 80 and 82 extending forwardly from support plate assembly 84.

Support plate assembly 84 includes a forward support plate 86 having a front face 88 and a rear face 90. Rear support plate 92 has a front face 94 and a rear face 96 which is affixed to front face 74 of cylinder 64 by means of welding, bolts or other known securement means. Circumferentially disposed shafts 98 extend around the periphery of and between front face 94 and rear face 90 and are secured thereto so that front support plate 86 is maintained in spaced parallel relation relative to rear support plate 92. Although only two support shafts 98 are disclosed in FIG. 4, a greater number will customarily be utilized depending upon the diameter of the plates 86 and 92. In this way, the support plate assembly has a fixed orientation relative to the cylinder 64 and is of sturdy construction for reasons to be explained.

Cylinder 100 is disposed in core block 102 which is coaxial with arm 34 and which serves to reinforce the connection between support plate 86 and support plate 92. Support plate 86 has a radially extending air supply duct 104 to which the air line 106 is connected by means of connector 108. Similarly, support plate 92 has a radially extending air supply duct 110 in communication with cylinder 100 for supplying pressurized air from line 112 through connector 114. In this way, air lines 106 and 112 supply pressurized air to cylinder 100 by means of ducts 104 and 110 in order to cause longitudinal displacement of piston 116 slideably disposed in cylinder 100. Support plate 86 has an opening 118 therein coaxial with cylinder 100 and through which a portion of piston 116 extends. A seal 120 is disposed about openign 118 and cooperates with piston 116 for preventing leakage of air from the cylindeer 100. Radially extending flange 122 is coaxial with piston 116 and is received in the aligned recesses 124 and 126 of the jaws 76 and 78, respectfully.

As best shown in FIG. 4, jaw mounts 80 and 82 are generally equidistant from opening 118; that is, from the longitudinal axis of gripping jaw assembly G. The piston 116 which defines the longitudinal axis of the gripping jaw assembly G may, in certain instances, be aligned with the longitudinal axis of arm 34 so that the arm 34 may provide a rotational axis for the end effector E as well as for E1.

Each of the jaws 76 and 78 includes an opening through which pins 128 and 130 extend, respectively, for pivotally securing the jaws 76 and 78 to the jaw mounts 80 and 82, respectively. Preferably, the jaw mounts 80 and 82 include aligned apertures 132 and 134, respectively, for receiving the pins 128 and 130, respectively. In this way, the pins 128 and 130 define pivot axes for the jaws 76 and 78. As shown in FIG. 3, each of the jaw mounts 80 and 82 includes forwardly extending mount members 136 and 138 which are disposed in spaced parallel relation on either side of the jaws 76 and 78. The pins 128 and 130 thereby extend between the mount members 136 and 138.

Preferably, the distal portion of each of jaws 76 and 78 includes a gripper 140 and 142, respectively. The grippers 140 and 142 are moved in cooperative relation by longitudinal shifting of the flange 122 of the piston 116 in response to air supplied to either of lines 106 and 112. The flange 122 is received within the recesses 124 and 126 so that forward motion of the flange 122 causes the front face thereof to engage the front face of the recesses 124 and 126 and to thereby cause the jaws to pivot circumferentially away from each other in order to release work 18. Rearward movement of the piston 116, however, causes the rear face of flange 122 to engage the rear face of recesses 124 and 126 so that the jaws 76 and 78 thereby pivot toward each other so that the grippers 140 and 142 may grasp work 18. Preferably, a sensing switch 144 is connected to gripper 142 in order to ascertain that work 18 has, in fact, been gripped between the jaws 76 and 78.

Preferably, seal 146, as best shown in FIG. 3, extends between support plates 86 and 92 and thereby prevents dirt and other particulates from entering the region between the plates 86 and 92. Similarly, a forwardly extending support block 148 extends forwardly from front face 88 and thereby minimizes the possibility of damage to the mounts 80 and 82 and their operating components.

Guideway 150 is secured to rear face 96, as best shown in FIG. 2, and extends transverse to the longitudinal axis of shaft 34. Guideway 150 has a guide slot 152 extending a substantial distance over the length thereof. Guideway 150 is pivotally secured to L-shaped bracket 154 extending forwardly from cylinder and piston assembly 156. Preferably, bracket 154 includes an opening 158 in which pin 160 is received and which thereby serves to pivotally secure guideway 150 to bracket 154 in order to permit pivoting of the gripping jaw assembly G of end effector E. The gripping jaw assembly G of end effector E is the same gripping jaw assembly G which was discussed with regard to end effector E1 of FIGS. 3 and 4. Consequently, no additional disclosure of the gripping jaw assembly G is believed necessary. Suffice it to say that the guideway 150 is centrally disposed on the rear face 96 of rear plate 92 so that the guideway 150 is in transverse alignment with the longitudinal axis defined by arm 34.

Cylinder and piston assembly 156 includes a longitudinally extending cylinder 162 secured to transverse plate 164 affixed to and, preferably, integral with collar 44. Cylinder 162 is, preferably, air-powered and therefore has air connections 166 and 168 from which air lines 170 and 172 extend, respectively. Piston 174 extends from cylinder 156 through an opening (not shown) in the forward face of cylinder 162 and a corresponding opening (not shown) in bracket 154. In this way, the piston 174 is coaxially aligned with arm 34. Clevis 176 is secured to the distal portion of piston 174, as best shown in FIGS. 1 and 2. Clevis 176 includes forwardly extending members 178 and 180 which are disposed in spaced parallel relation and between which guideway 150 is received. Roller pin 182 extends between aligned openigns 184 and 186 in members 178 and 180, respectively, and through slot 152 of guideway 150. In this way, the rolle pin 182 may slide in slot 152 of guideway 150 during longitudinal movement of piston 174 of cylinder 162 in order to permit the piston 174 to have maximum possible displacement. Consequently, the gripper assembly G of the end effector E may pivot on pin 160 in response to longitudinal movement of piston 174. Preferably, an adjustable stop 188 extends forwardly from bracket 154 parallel to the forwardly extending member 190 of bracket 154 in order to engage guideway 150 during pivoting of the gripper assembly G. Engagement of the guideway 150 with the stop 188 therefore prevents excessive pivoting of the gripper assembly G and provides positive stopping and positioning. The air-powered cylinder 162 is utilized in order to cooperate with the stop 188 because such a cylinder will not suffer damage by such a stop mechanism.

OPERATION OF END EFFECTOR E

The end effector E, as shown in FIG. 2, is capable of simulating wrist action because of the pivotal mounting of grippe jaw assembly G to bracket 154 by means of pin 160. Both the gripper jaw assembly G and the cylinder and piston assembly 156 are air-powered and therefore may be supplied from a common air source located in base 12 or in arm housing 22. The mechanism for rotating shaft 34 on its longitudinal axis permits maximum flexibility in use of end effector E by permitting the end effector E to be rotated and, simultaneously, pivoted. Initially, the robot R is disposed for performing a first operation and the gripper assembly G is set for accomplishing this first task, such as holding work 18 adjacent a machine tool. The robot R as is well known includes a programming mechanism permitting the robot R to perform a given series of tasks. The robot R is then programmed for performing these tasks and for consequently operating the gripper jaw assembly G for closing and opening the jaws 76 and 78. Furthermore, the programming is utilized for causing rotation of arm housing 22, and thereby arm 34, on shaft 20 and for raising and lowering the angle of arm housing 22 by means of cylinder 32 and piston 30. In this way, the end effector E can be positioned throughout substantially more than 50% of the working area defined as a sphere centered on hinge assembly 24. The programming mechanism is, consequently, utilized to cause longitudinal displacement of arm 34 by means of piston 36 and pivoting of a gripper assembly jaw G bymeans of longitudinal displacement of piston 174 of cylinder 162. In this way, the gripper jaw assembly G of end effector E can be utilized to grasp, pickup, transport and release workpiece 18 between by two points positioned within its working sphere.

OPERATION OF END EFFECTOR E1

Operation of end effector E1 is expeditiously utilized in those operations where lateral shifting is required, rather than pivotal displacement as may be performed by end effector E. Such lateral shifting may be called for when a part, such as workpiece 18, must be inserted into spindle 14 for being held there so as to be operated on by the tools of turret 16. Lateral shifting of the workpiece 18 when grasped between the jaws 76 and 78 of the end effector E1 may be readily accomplished, because of the piston 62 extending between the ears 54 and 56 which are disposed parallel to the longitudinal axis of shaft 34. Consequently, the workpiece 18 moves along a line which is transverse to the longitudinal axis of arm 34 and may therefore be inserted into the spindle without becoming canted or otherwise angularly disposed. Naturally, the robot R will, as previously described, utilize a programming mechanism for causing operation of end effector E1 so as to perform the necessary function. Again, the end effector E1 may be utilized to grasp, move, and release workpiece 18 from substantially anywhere within the working sphere that has been defined.

While this invention has been described as having a preferred design, it is understood that it is capable of further modifications, uses and/or adaptations of the invention following in general the principle of the invention and including such departures from the present disclosure as come within known or customary practice in the art to which the invention pertains, and as may be applied to the central features herein before set forth, and fall within the scope of the invention of the limits of the appended claims.

What I claim is:

1. A robot gripper jaw assembly, comprising:
   (a) support means comprising first and second spaced apart generally parallel plate means and each plate means including a front and a rear face;
   (b) means extending between and secured to each of said plate means for maintaining said plate means spaced apart and generally parallel;
   (c) jaw mounting means extending from said first plate means,
   (d) a pair of cooperating jaw pivotally mounted to said mounting means for gripping work;
   (e) said first plate means having a centrally disposed aperture therethrough;
   (f) a cylinder and piston assembly comprising a first cylinder and a first piston aligned with said aperture and secured to and extending between said plate means;
   (g) said first piston including a portion extending through said aperture and engageable with each of said jaws for pivoting said jaws;
   (h) fluid supply means disposed in each plate means and communicating with said first cylinder for driving said first piston forwardly and rearwardly for causing pivoting of said jaws;
   (i) said support means and said cylinder and piston assembly having a common rotational axis;
   (j) means for simultaneously rotating said support means and said cylinder and piston assembly on said rotational axis;
   (k) means for laterally shifting said support means and said cylinder and piston assembly relative to said rotational axis;
   (l) a bracket including means for securing said bracket to a robot arm and first and second forwardly extending ears;
   (m) said shifting means connected to said bracket and to said support means and cooperating with said bracket for shifting said support means;
   (n) said shifting means extending betweens aid ears for causing said support means to shift therebetween;
   (o) a second piston extending between said ears;
   (p) a second cylinder displaceably mounted to said second piston and being connected to and carrying said support means; and,
   (q) means being associated with said second cylinder for causing movement thereof on said second piston and thereby lateral shifting of said support means.

2. The assembly as defined in claim 1, and wherein said jaw mounting means includes:
   (a) first and second spaced jaw mounts extending forwardly from said first plate means front face;
   (b) each of said jaw mounts being spaced equidistant from said aperture; and,
   (c) each of said jaws being pivotally secured at a first end to one of said mounts and each jaw including a remote distal portion and said jaws adapted for pivoting on spaced parallel axes so that the distal portion of each jaw cooperatively pivots with the other jaw for thereby gripping and releasing work in response to movement of said piston.

3. The assembly as defined in claim 2, wherein:
   (a) each of said mounts having an aperture therethrough and said apertures disposed in spaced parallel relation;
   (b) each of said jaws having an opening aligned with the aperture of the associated mount; and,
   (c) pin means extending through each of said apertures and the aligned openings for thereby pivotally securing said jaws to said mount.

4. The assembly as defined in claim 1, wherein:
   (a) a flange being associated with a forward portion of said second pistion; and,
   (b) said flange being engageable with each of said jaws for causing pivoting of said jaws.

5. The assembly as defined in claim 4, wherein:
   (a) a recess being disposed in each of said jaws and said recesses being algined; and,
   (b) said flange being positioned in said recesses for thereby keying said jaws to said piston.

6. The assembly as defined in claim 5, wherein:
   (a) each of said jaws having an inner face and an outer face; and,
   (b) said recesses being disposed in the inner face of each of said jaws.

7. The assembly as defined in claim 5, wherein:
   (a) said recesses being proximate said jaw mounting means for permitting maximum pivoting of each of said jaws.

8. The assembly as defined in claim 5, wherein:
   (a) each of said recesses having a forward face and a rearward face;
   (b) said flange being engaged with the rearward face of each recess during rearward movement of said second piston for thereby causing said jaws to pivot toward each other for gripping work; and,
   (c) said flange being engaged with the forward face of each recess during forward movement of said piston for thereby causing said jaws to pivot away frome ach other for releasing work.

9. The assembly as defined in claim 1, wherein:

(a) said fluid supply means including a fluid supply duct extending radially through each of said plate means.

10. The assembly as defined in claim 1, further comprising:
(a) means associated with said second plate means for securing said second plate means to a robot arm.

11. The assembly as defined in claim 1, wherein:
(a) means being associated with said bracket for preventing pivoting of said support means.

12. The assembly as defined in claim 1, wherein:
(a) at least a first support rod extending between said ears generally parallel to said second piston; and,
(b) said support rod engaged with said second cylinder for preventing pivoting of said support plate.

13. The assembly as defined in claim 12, wherein:
(a) first and second support rods extending between said ears in spaced parallel relation and parallel to said second piston; and,
(b) each of said support rods engaged with said second cylinder for preventing pivoting thereof.

14. The assembly as defined in claim 13, wherein:
(a) said support rods being equidistnat said second piston.

15. The assembly of claim 1, wherein:
(a) each of said plate means being circular and of equal radial dimension; and,
(b) said first cylinder having a diameter less than that of said plate means.

16. The assembly of claim 15, wherein:
(a) said maintaining means being disposed radially outwardly of said cylinder and piston assembly.

17. A robot gripper jaw assembly, comprising:
(a) support means comprising first and second spaced apart generally parallel palte means and each plate means including a front and a rear face;
(b) means extending between and secured to each of said plate means for maintaining said plate means spaced apart and generally parallel;
(c) jaw mounting means extending from said first plate means;
(d) a pair of cooperating jaw pivotally mounted to said mounting means for gripping work;
(e) said first plate means having a centrally disposed aperture therethrough;
(f) a cylinder and piston assembly comprising a first cylinder and a first piston aligned with said aperture and secured to and extending between said plate means;
(g) said first piston including a portion extending through said aperture and engageable with each of said jaws;
(h) fluid supply means disposed in each plate means and communicating with said first cylinder for driving said first piston forwardly and rearwardly for thereby causing pivoting of said jaws; .
(i) said support means and said cylinder and piston assembly having a common rotational axis;
(j) means for simultaneously rotating said support means and said cylinder and piston assembly on said axis;
(k) means for angularly pivoting said support means and said cylinder and piston assembly relative to said common rotational axis;
(l) pivot drive means including means for securing said pivot drive means to a robot arm;
(m) said pivoting means being connected to and cooperating with said pivot drive means for causing pivoting of said support means;
(n) a mount extending from said pivot drive means;
(o) means pivotally connecting said support means to said mount;
(p) said pivot drive means including a forwardly and rearwardly movable portion engaged with said support means and spaced from said connecting means so that forward and rearward movement of said movable portion causes pivoting of said support means about said connecting means;
(q) a guideway being secured to said second plate means rear face;
(r) said connecting means pivotally connecting said guideway to said mount so that pivoting of said guideway causs associated pivoting of said support means; and,
(s) guide means extending along said guideway and being engaged with said movable portion for permitting extended movement of said movable portion.

18. The assembly as defined in claim 17, wherein:
(a) said guide means including a slot; and,
(b) said movable portion including a sliding portion received in and slideable in said slot for thereby permitting pivoting of said guideway about said connecting means.

19. The assembly as defined in claim 18, wherein:
(a) said movable portion being disposed proximate and parallel to said mount.

20. The assembly as defined in claim 18, and wherein said mount includes:
(a) a forward aperture;
(b) said guideway including an opening aligned with said forward aperture;
(c) pin means extending through said forward aperture and said opening for pivotally connecting said support means to said mount and for thereby defining a pivot axis; and,
(d) said slot extending transverse to said pivot axis.

21. The assembly as defined in claim 17, wherein:
(a) stop means extending from said pivot drive means and being engageable with said guideway for controlling pivoting of said support means.

22. The assembly as defined in claim 17, and wherein said pivot drive means includes:
(a) a cylinder and piston assembly and the piston of said cylinder and piston assembly having a portion operably associated with said means so that movement of said piston causes pivoting of said support means.

23. The assembly as defined in claim 17, and wherein said jaw mounting means includes:
(a) first and second spaced jaw mounts extending forwardly from said first plate means front face;
(b) each of said jaw mounts being spaced equidistant from said aperture; and,
(c) each of said jaws being pivotally secured at a first end to one of said mounts and each jaw including a remote distal portion and said jaws adapted for pivoting on spaced parallel axes so that the distal portion of each jaw cooperatively pivots withthe other jaw for thereby gripping and releasing work in response to movement of said second piston.

24. The assembly as defined in claim 23, wherein:

(a) each of said mounts having an aperture therethrough and said apertures disposed in spaced parallel relation;
(b) each of said jaws having an opening aligned with the aperture of the associated mount; and,
(c) pin means extending through each of said apertures and the aligned openings for thereby pivotally securing said jaws to said mount.

25. The assembly as defined in claim 17, wherein:
(a) a flange being associated with a forward portion of said second pistion; and,
(b) said flange being engageable with each of said jaws for causing pivoting of said jaws.

26. The assembly as defined in claim 25, wherein:
(a) a recess being disposed in each of said jaws and said recesses being aligned; and,
(b) said flange being positioned in said recesses for thereby keying said jaws to said second pistion.

27. The assembly as defined in claim 26, wherein:
(a) each of said jaws having an inner face and an outer face; and,
(b) said recesses being disposed in the inner face of each of said jaws.

28. The assembly as defined in claim 27, wherein:
(a) said recesses being proximate said jaw mounting means for permitting maximum pivoting of each of said jaws.

29. The assembly as defined in claim 27, wherein:
(a) each of said recesses having a forward face and a rearward face;
(b) said flange being engaged with the rearward face of each recess during rearward movement of said second piston for thereby causing said jaws to pivot toward each other for gripping work; and,
(c) said flange being engaged with the forward face of each recess during forward movement of said second piston for thereby causing said jaws to pivot away from each other for releasing work.

30. The assembly as defined in claim 17, wherein:
(a) said fluid supply means including a fluid supply duct extending radially through each of said plate means.

* * * * *